(12) United States Patent
Narahara

(10) Patent No.: US 8,199,349 B2
(45) Date of Patent: Jun. 12, 2012

(54) FACSIMILE COMMUNICATION DEVICE AND SYSTEM FOR TRANSMITTING A TRANSMISSION IMAGE WITH AN EMBEDDED CODE DATA AND INFORMATION

(75) Inventor: Kazunobu Narahara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 779 days.

(21) Appl. No.: 12/292,525

(22) Filed: Nov. 20, 2008

(65) Prior Publication Data

US 2009/0135450 A1    May 28, 2009

(30) Foreign Application Priority Data

Nov. 26, 2007    (JP) ................. 2007-304280

(51) Int. Cl.
 *G06F 3/12* (2006.01)
(52) U.S. Cl. .. 358/1.15; 370/352; 370/522; 379/100.01; 379/910
(58) Field of Classification Search ............ 358/1.15
 See application file for complete search history.

(56) References Cited

U.S. PATENT DOCUMENTS 4,811,111 A * 3/1989 Kurokawa ............ 358/440

FOREIGN PATENT DOCUMENTS

| JP | 05-048790 | | 2/1993 |
|---|---|---|---|
| JP | 11-046292 | A | 2/1999 |
| JP | 2000-174943 | A | 6/2000 |

OTHER PUBLICATIONS

English Machine Translation of JP H11-046292-A (Kawasaki, published Feb. 16, 1999).*
English Machine Translation of JP 2000-174943-A (Akiba, published Jun. 23, 2000).*

* cited by examiner

*Primary Examiner* — Benny Q Tieu
*Assistant Examiner* — Juan Guillermety
(74) *Attorney, Agent, or Firm* — Kubotera & Associates, LLC

(57) ABSTRACT

A facsimile communication device has a multicast function capable of sequentially transmitting a transmission image to a plurality of receiving devices. The facsimile communication device includes an origination information data generation unit for generating origination information data related to the facsimile communication device; a multicast destination information data generation unit for generating multicast destination information data related to a multicast destination to which the facsimile communication device transmits the transmission image; and a transmission image data generation unit for adding the origination information data generated with the origination information data generation unit and the multicast destination information data generated with the multicast destination information data generation unit to the transmission image.

10 Claims, 20 Drawing Sheets

---

Origination: Intellectual Property department
10/19/2007 13:01

Attention; this FAX letter is sent to parties coded in the bar code at a right lower corner. A special device will be needed to read the bar code.

Re: Meeting

To parties involved

The meeting will be held at a conference room from PM 1:00 on January 1.

Re: Meeting

To parties involved

The meeting will be held at a conference room from PM 1:00 on January 1.

Origination: Intellectual Property department
10/19/2007 13:01

Attention; This fax letter is sent to the following parties:
LSI Business Headquarters, Manager Mr. OKI, Technology Development team Re: Meeting To parties involved The meeting will be held at a conference room from PM 1:00 on January 1.

FIG. 3

Origination: Intellectual Property department
10/19/2007 13:01

Attention; this FAX letter is sent to parties coded in the bar code at a right lower corner. A special device will be needed to read the bar code.

Re: Meeting

To parties involved

The meeting will be held at a conference room from PM 1:00 on January 1.

FACSIMILE COMMUNICATION DEVICE AND SYSTEM FOR TRANSMITTING A TRANSMISSION IMAGE WITH AN EMBEDDED CODE DATA AND INFORMATION

BACKGROUND OF THE INVENTION AND RELATED ART STATEMENT

The present invention relates to a facsimile communication device and a facsimile communication system. More specifically, the present invention relates to a facsimile communication device and a facsimile communication system having a multicast function.

In a conventional facsimile communication device and a conventional facsimile communication system, origination information registered in advance is converted to a text string, and the text string is combined with an image at a corner thereof before transmission. In a conventional facsimile communication device and a conventional facsimile communication system having a multicast function, a text string is combined in a similar way. The origination information includes telephone number information, originator information, and page number information (refer to Patent Reference).

Patent Reference: Japanese Patent Publication No. 05-48790

In the conventional facsimile communication device having a multicast function, when a user receives and sees a transmitted image, it is difficult to identify other destinations to which the transmitted image is sent other than the user itself.

In view of the problems described above, an object of the present invention is to provide a facsimile communication device capable of solving the problems of the conventional facsimile communication device.

Further objects and advantages of the invention will be apparent from the following description of the invention.

SUMMARY OF THE INVENTION

In order to attain the objects described above, according to a first aspect of the present invention, a facsimile communication device has a multicast function capable of sequentially transmitting a transmission image to a plurality of receiving devices. The facsimile communication device includes an origination information data generation unit for generating origination information data related to the facsimile communication device; a multicast destination information data generation unit for generating multicast destination information data related to a multicast destination to which the facsimile communication device transmits the transmission image; and a transmission image data generation unit for adding the origination information data generated with the origination information data generation unit and the multicast destination information data generated with the multicast destination information data generation unit to the transmission image.

According to a second aspect of the present invention, a facsimile communication device has a multicast function capable of sequentially transmitting a transmission image to a plurality of receiving devices. The facsimile communication device includes an origination information data generation unit for generating origination information data related to the facsimile communication device; a code data generation unit for generating code data including a multicast destination to which the facsimile communication device transmits the transmission image; and a transmission image data generation unit for adding the origination information data gener- ated with the origination information data generation unit and the code data generated with the code data generation unit to the transmission image.

In the facsimile communication device of the present invention, when the facsimile communication device sequentially transmits the transmission image, the multicast destination information data is added to the transmission image. Accordingly, it is possible to easily identify a destination to which the transmission image is sent.

BRIEF DESCRIPTION OF THE DRAWINGS

FIG. 3 is a schematic view showing an example of received contents of multicast according to the first embodiment of the present invention;

DETAILED DESCRIPTION OF PREFERRED EMBODIMENTS

Hereunder, embodiments of the present invention will be explained with reference to the accompanying drawings.

First Embodiment

Figures 1, 2:
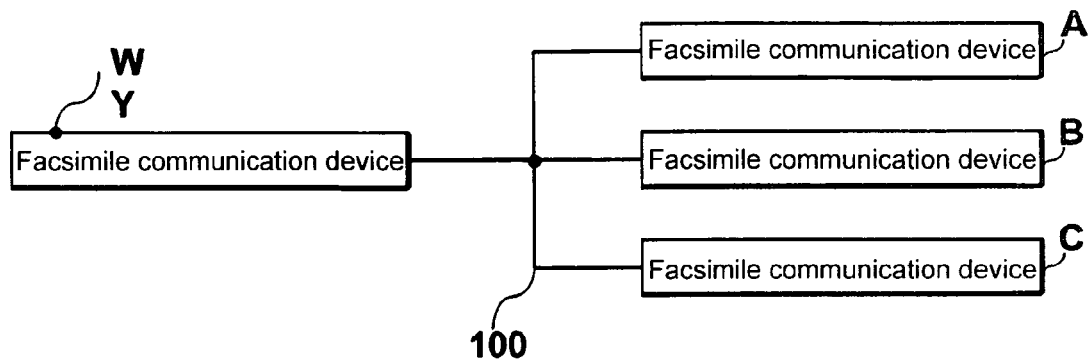
FIG. 1 is a block diagram showing a facsimile communication system according to the present invention.
FIG. 2 is a schematic view showing an example of transmitted contents of multicast according to a first embodiment of the present invention.

A first embodiment of the present invention will be explained. FIG. 1 is a block diagram showing a facsimile communication system according to the present invention.

As shown in FIG. 1, a facsimile communication device W as a main device is connected to a facsimile communication device A, a facsimile communication device B, and a facsimile communication device C through a network 100.

In the embodiment, the facsimile communication device W has a multicast function. It is assumed that the facsimile communication device W is located in an intellectual property department of a company K. Further, it is assumed that the facsimile communication device A is located in an LSI business division headquarters, the facsimile communication device B is located in an office of a manager OKI; and the facsimile communication device C is located in a technology development team.

FIG. 2 is a schematic view showing an example of transmitted contents of multicast according to the first embodiment of the present invention. As an example, FIG. 2 shows a fax letter to be transmitted through multicast regarding a meeting from a person in the intellectual property department to parties involved.

When the person sets the fax letter on the facsimile communication device W and performs a specific operation, the facsimile communication device W reads and sequentially sends the fax letter to destinations to be transmitted, i.e., the facsimile communication device A, the facsimile communication device B, and the facsimile communication device C.

FIG. 3 is a schematic view showing an example of received contents of multicast according to the first embodiment of the present invention. As an example, FIG. 3 shows a fax letter to be received at the facsimile communication device A. As shown in FIG. 3, in the received contents, a text "This fax letter is sent to the following parties: LSI business division headquarters, Manager OKI, Technology development team" to the contents to be transmitted shown in FIG. 2. Note that "Technology development team" is underlined to represent a destination.

Figure 4:
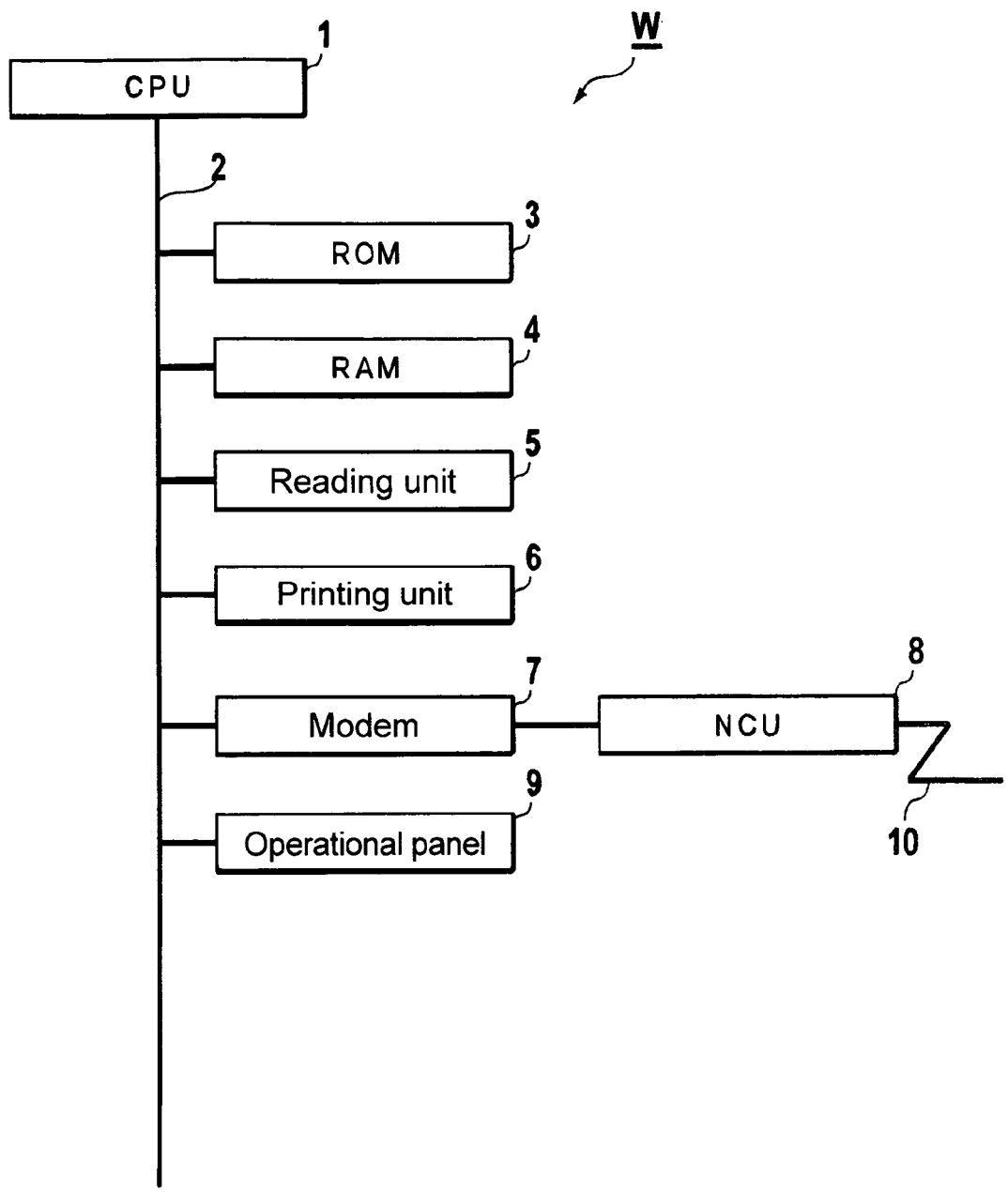
FIG. 4 is a block diagram showing a facsimile communication device according to the first embodiment of the present invention.

A configuration of the facsimile communication device W will be explained next. FIG. 4 is a block diagram showing the facsimile communication device W according to the first embodiment of the present invention. As shown in FIG. 4, the facsimile communication device W includes a CPU (Central Processing Unit) 1; a system bus 2; an ROM (Read Only Memory) 3; an RAM (Random Access Memory) 4; a reading unit 5; a printing unit 6; a modem 7; an NCU (Network Control Unit) 8; and an operational panel 9.

In the embodiment, the CPU 1 is a central processing unit for executing a specific control program stored in the ROM 3 to control the facsimile communication device W as a whole.

The system bus 2 is a signal path for connecting each component of the facsimile communication device W (described later). The ROM 3 stores the specific control program to be executed with the CPU 1 (described later). The RAM 4 provides a calculation area necessary for the specific control program to be executed with the CPU 1 (described later).

In the embodiment, the reading unit 5 is a scanner device using a CCD (Charge Coupled Device) for reading an original and converting an image to dot image data. The printing unit 6 is a printer device of a thermal recording type, an electric-photography type, and the likes for outputting image data received through facsimile communication as a hard copy. The modem 7 is a modulation-demodulation device for modulating and demodulating control data and image data through a facsimile communication control order, and for exchanging data with other facsimile communication devices.

In the embodiment, the NCU 8 is a network control device for controlling connection and disconnection between the modem 7 and the network 10 (public telephone network). The operational panel 9 displays a state of the facsimile communication device W through a display device such as a liquid crystal display (LCD) unit and a CRT display unit. The operational panel 9 functions as a user interface having a function key, cursor keys, a start key, and the likes necessary for an operator to operate the facsimile communication device W (described later).

Figure 5:
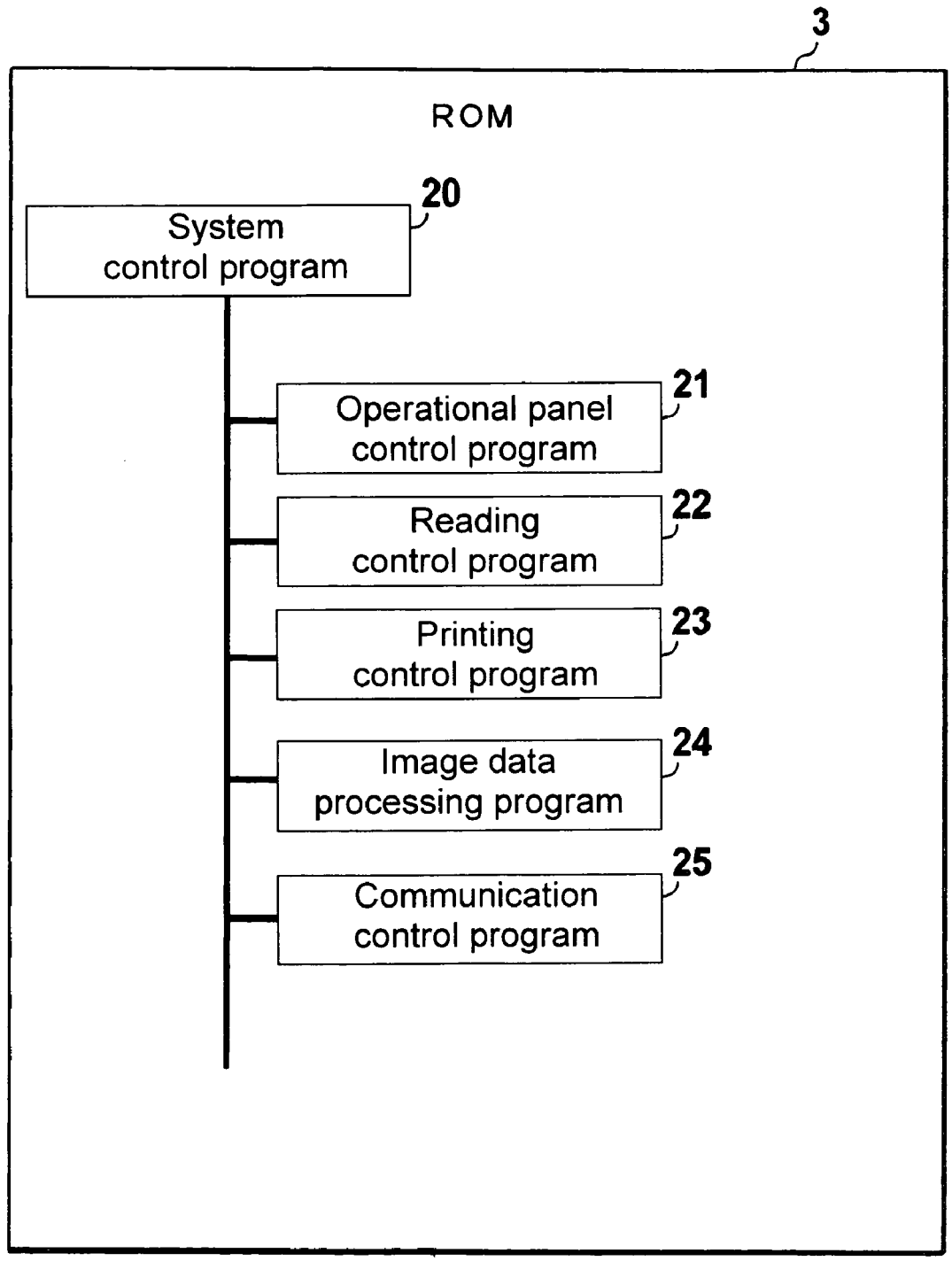
FIG. 5 is a schematic view showing contents of an ROM (Read Only Memory) of the facsimile communication device according to the first embodiment of the present invention.

A configuration of the ROM 3 will be explained next. FIG. 5 is a schematic view showing contents of the ROM 3 of the facsimile communication device W according to the first embodiment of the present invention.

As shown in FIG. 5, the ROM 3 includes a system control program 20; an operation panel control program 21; a reading control program 22; a printing control program 23; an image data processing program 24; and a communication control program 25.

In the embodiment, the system control program 20 is a control program to be executed with the CPU 1 for controlling each component of the facsimile communication device W and starting or adjusting each program (described later). Further, the operation panel control program 21 is a control program to be executed with the CPU 1 for controlling the operational panel 9 and sharing the function of the user interface, thereby making it possible for the user to input a telephone number and register various data.

Figure 6:
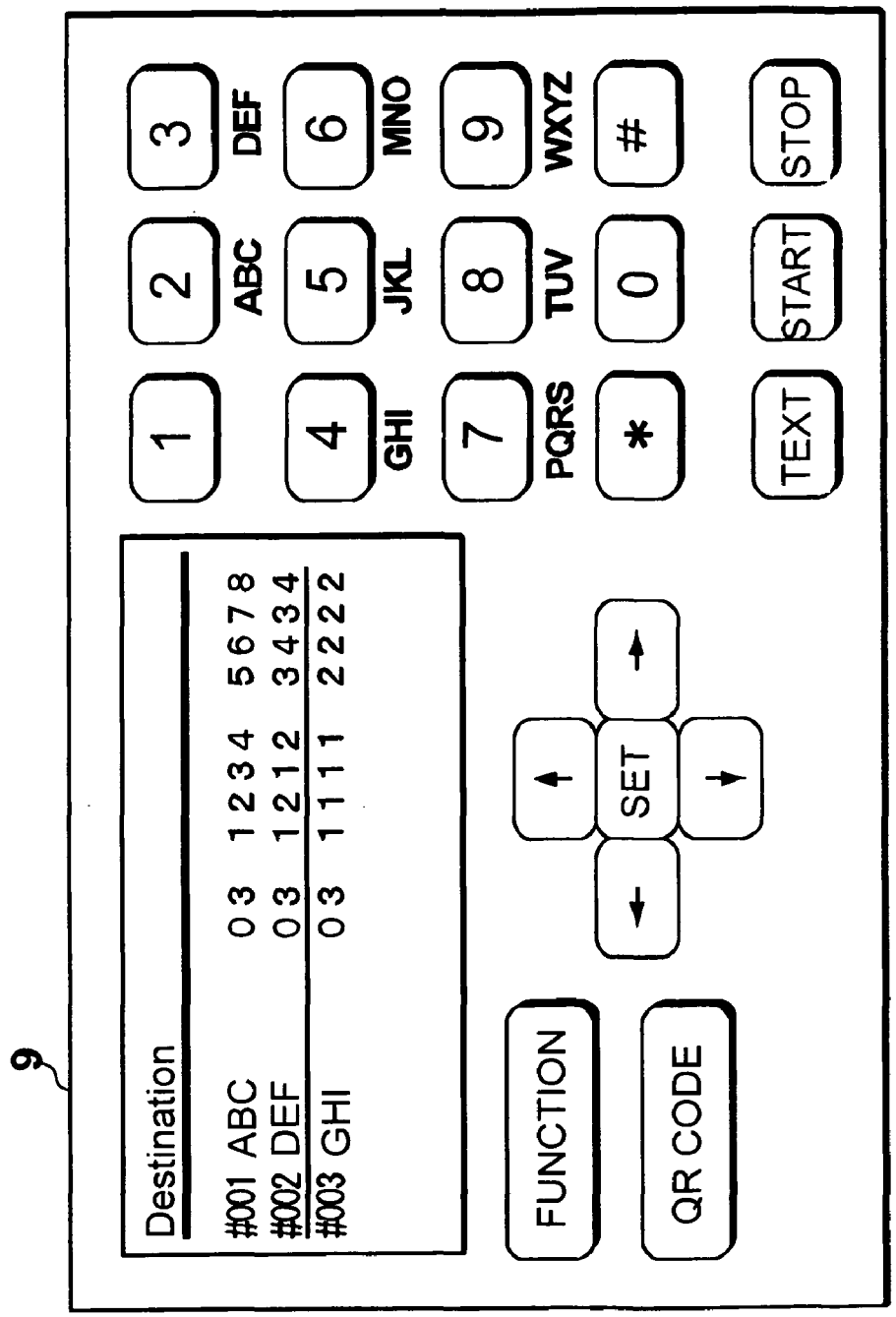
FIG. 6 is a schematic view showing an operational panel of the facsimile communication device according to the first embodiment of the present invention.

A configuration of the operational panel 9 will be explained next. FIG. 6 is a schematic view showing the operational panel 9 of the facsimile communication device W according to the first embodiment of the present invention. As shown in FIG. 6, the operational panel 9 includes the display unit, the function key, the cursor keys, the start key, and a QR key necessary for operating the facsimile communication device W as a whole.

In the embodiment, the reading control program 22 is a control program to be executed with the CPU 1 for controlling the reading unit 5 (refer to FIG. 3) and a series of operations regarding reading an original. Further, the printing control program 23 is a control program to be executed with the CPU 1 for controlling the printing unit 6 (refer to FIG. 3) and a series of operations regarding printing.

In the embodiment, the image data processing program 24 is a control program to be executed with the CPU 1 for executing edition of a transmitted image and generating FAX code data (described later). Further, the communication control program 25 is a control program to be executed with the CPU 1 for controlling the modem 7 and the NCU 8, and for connecting to the network (public telephone network) to execute the facsimile communication control order and receive image data.

Figure 7:
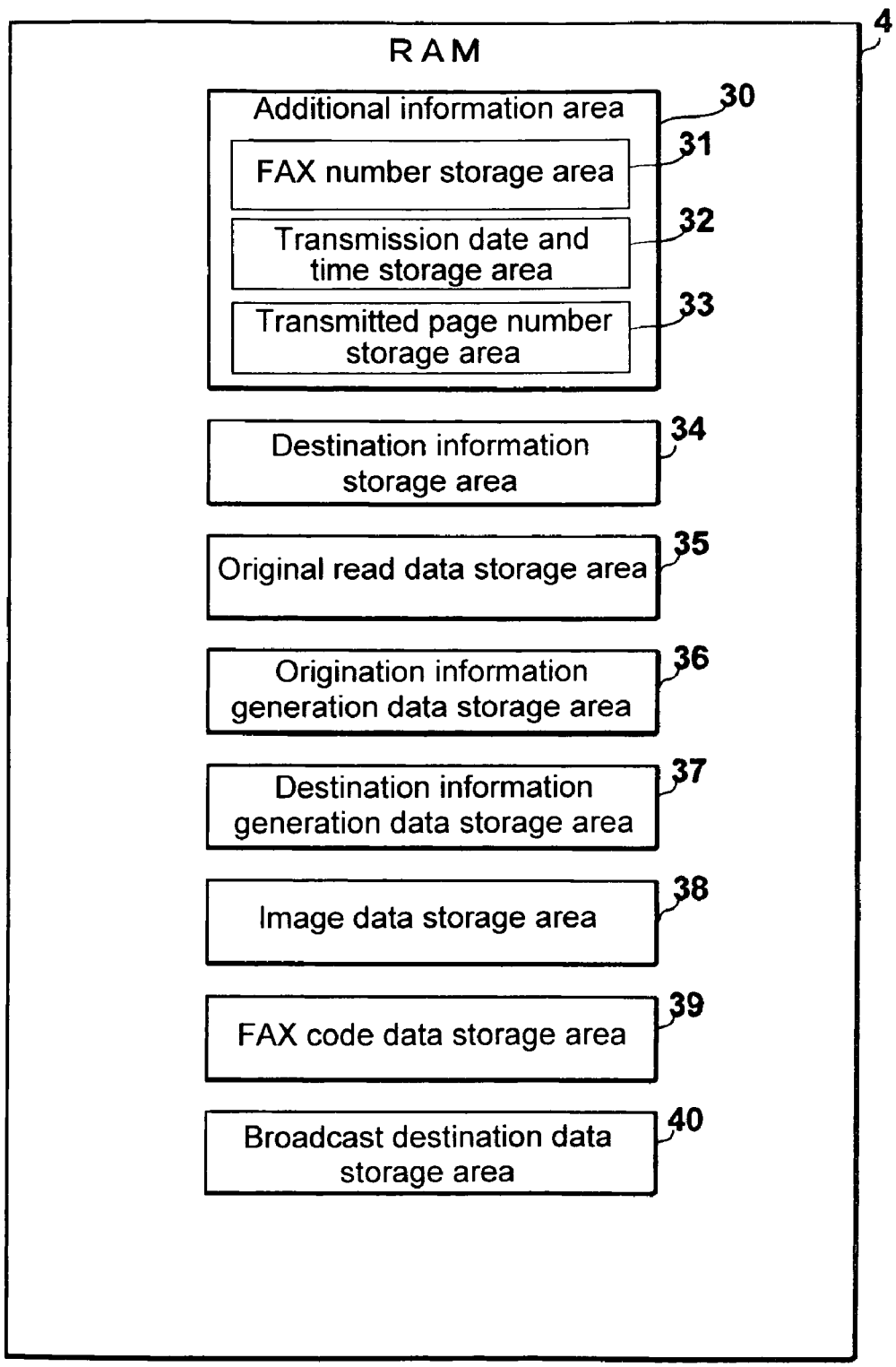
FIG. 7 is a schematic view showing contents of an RAM (Random Access Memory) of the facsimile communication device according to the first embodiment of the present invention.

A configuration of the RAM 4 will be explained next. FIG. 7 is a schematic view showing contents of the RAM 4 of the facsimile communication device W according to the first embodiment of the present invention.

As shown in FIG. 7, the RAM 4 includes an additional information area 30; a destination information storage area 34; an original read data storage area 35; an origination generation data storage area 36; a destination information generation data storage area 37; an image data storage area 38; a FAX code data storage area 39; and a multicast destination data storage area 40.

In the embodiment, the additional information area 30 includes a FAX number storage area 31, a transmission date and time storage area 32; and a transmitted page number storage area 33. The additional information area 30 is a memory area for storing origination information to be added to a transmission image. More specifically, the FAX number storage area 31 stores FAX number data of a device input by a user; the transmission date and time storage area 32 stores date and time data when the user starts facsimile transmission; the transmitted page number storage area 33 stores page number data to be read; and the destination information storage area 34 stores destination information input by the user through the operational panel 9.

Figure 8:
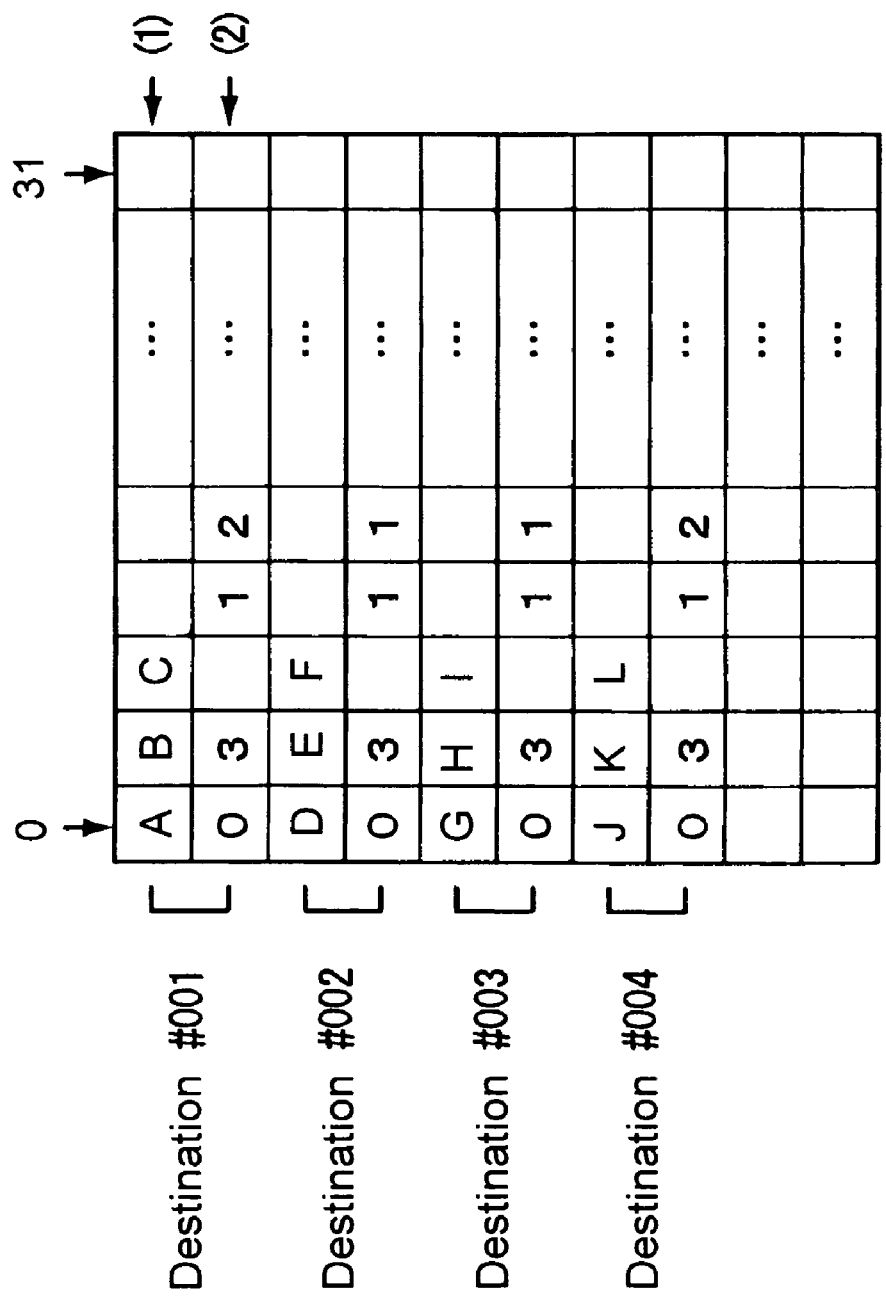
FIG. 8 is a schematic view showing a destination information storage area according to the first embodiment of the present invention.

A configuration of the destination information storage area 34 will be explained next. FIG. 8 is a schematic view showing the destination information storage area 34 according to the first embodiment of the present invention.

As shown in FIG. 8, the destination information storage area 34 includes a spreadsheet in which a destination name (1) and a destination telephone number (2) are arranged per destination. When a destination is selected upon facsimile transmission, the destination information storage area 34 is used, and the destination telephone number (2) is used as a dial number upon transmission as well.

In the embodiment, the original read data storage area 35 temporarily stores dot image data read when the CPU 1 executes the reading control program 22. Further, the origination generation data storage area 36 stores dot image data regarding origination data generated when the CPU 1 executes the image data processing program 24.

In the embodiment, the destination information generation data storage area 37 temporarily stores dot image data regarding the destination information generated when the CPU 1 executes the image data processing program 24. Further, the image data storage area 38 collectively stores the dot image data stored in the original read data storage area 35, the origination generation data storage area 36, and the destination information generation data storage area 37.

Figure 9:
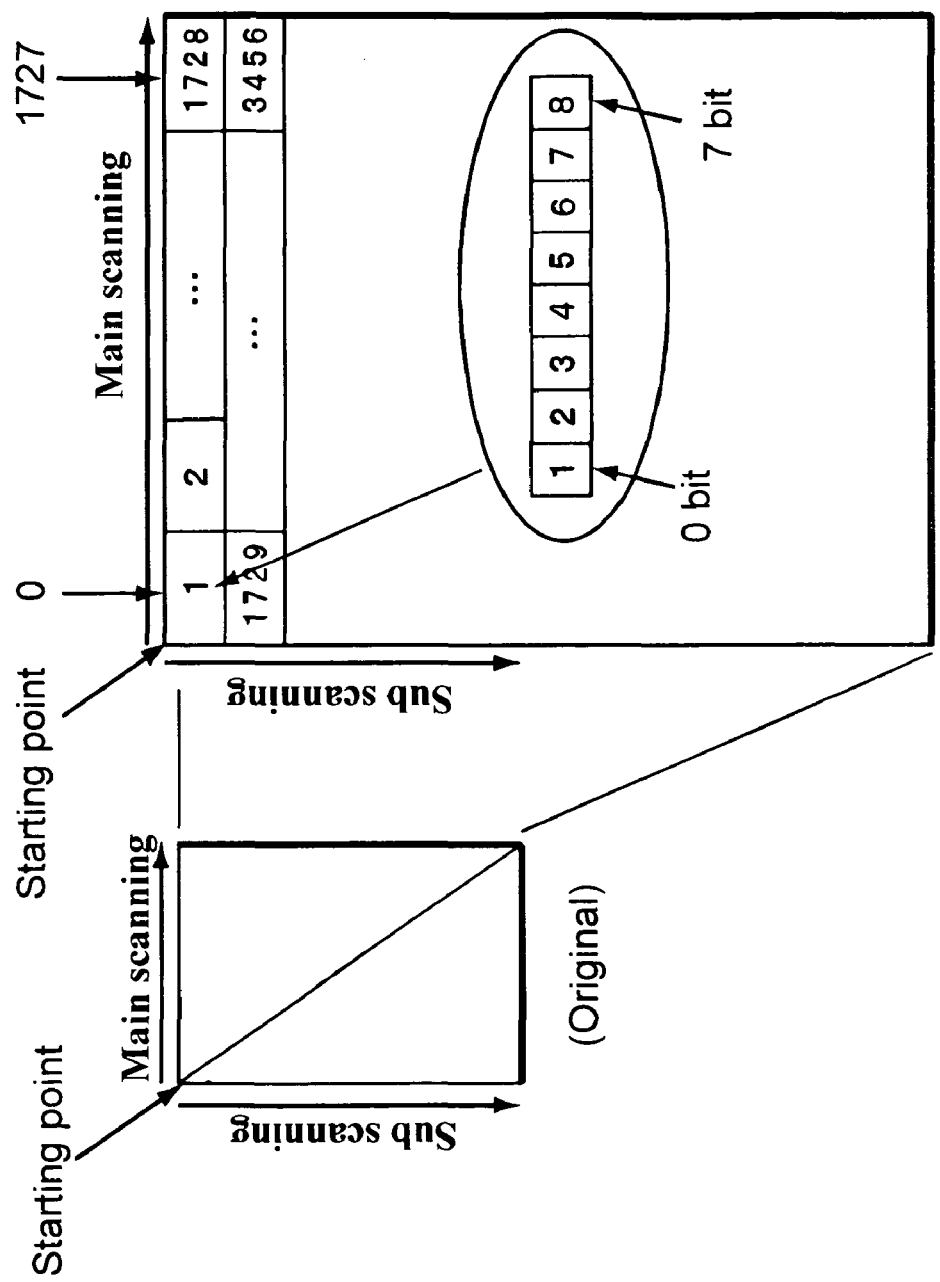
FIG. 9 is a schematic view No. 1 showing an image data storage area according to the first embodiment of the present invention.

A configuration of the image data storage area 38 will be explained next. FIG. 9 is a schematic view No. 1 showing the image data storage area 38 according to the first embodiment of the present invention.

As shown in FIG. 9, the image data storage area 38 stores the dot image data with a left upper corner of an original as a starting point. The starting point of the original corresponds to "0" address of the image data storage area 38. One line corresponds to data scanned the original from a left side to a right side (main scanning). When the original has an A4 size and is scanned at a standard resolution (8 dots/mm), one line becomes 1,728 bytes (one byte=8 dots). An end point of one line corresponds to "1,727" address of the image data storage area 38.

In the embodiment, the following lines correspond to data scanned the original from an upper side to a lower side (sub-scanning). When the original has the A4 size and is scanned at a standard resolution (3.851 line/mm), the following lines become about 1,143 lines (3.851 (line)×297 (mm)). Accordingly, the image data storage area 38 becomes a total of about 1,928 K bytes (1,727 (bytes)×1,143 (lines)).

In the embodiment, the FAX code data storage area 39 stores the FAX code data converted and generated from the dot image data stored in the image data storage area 38 when the CPU 1 executes the image data processing program 24. Further, the multicast destination data storage area 40 stores multicast destination information input by the user through the operational panel 9.

Figure 10:
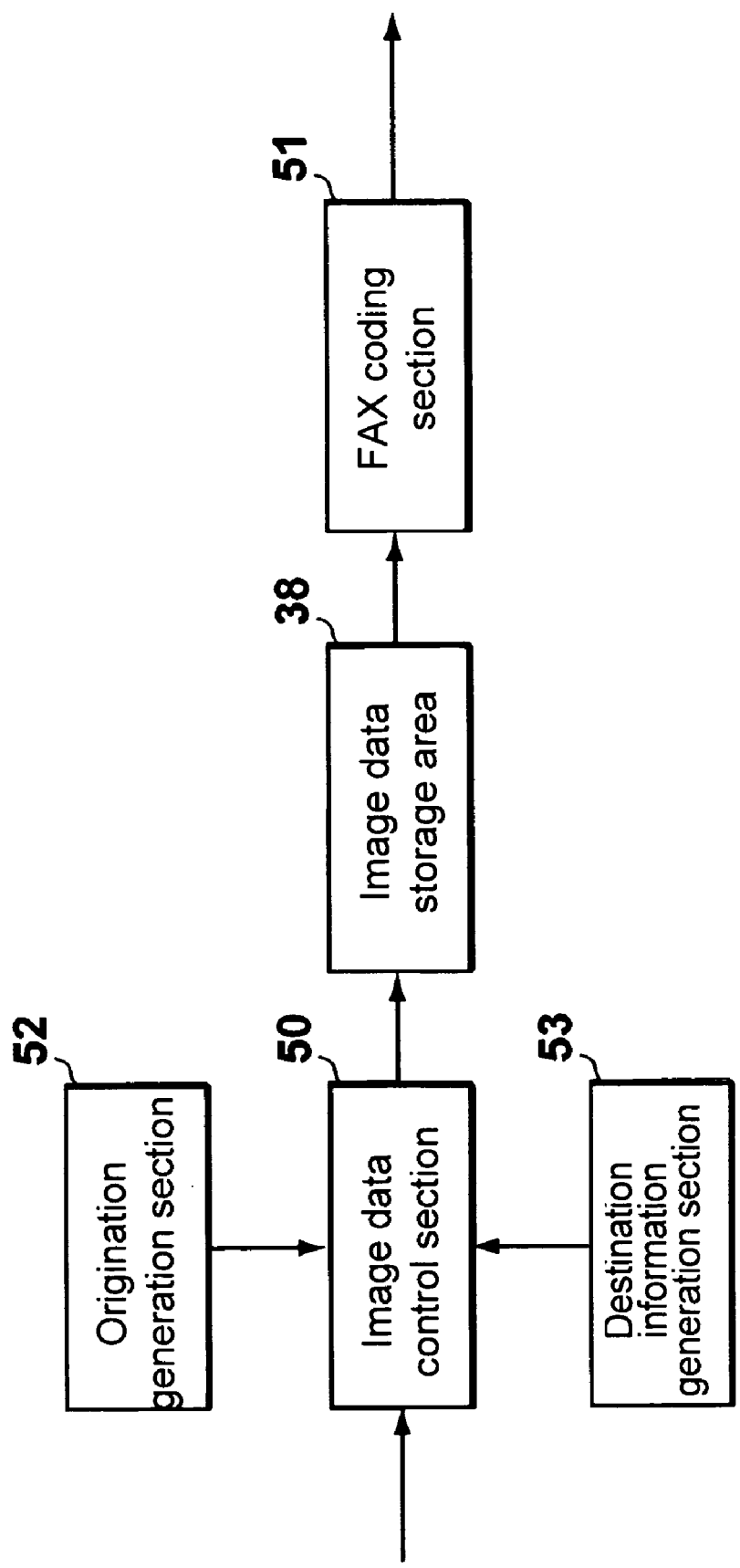
FIG. 10 is a block diagram showing a function of an image data processing program according to the first embodiment of the present invention.

A function of the image data processing program 24 will be explained next. FIG. 10 is a block diagram showing the function of the image data processing program 24 according to the first embodiment of the present invention.

As shown in FIG. 10, when the CPU 1 executes the image data processing program 24, the image data processing program 24 generates an image data control section 50; a FAX coding section 51; an origination generation section 52; and a destination information generation section 53 as functional blocks.

In the embodiment, the image data control section 50 executes the following four functions. First, the image data control section 50 executes a function for reading the dot image data stored in the original read data storage area 35 and writing the dot image data to the image data storage area 38. Second, the image data control section 50 executes a function for starting the origination generation section 52, reading the dot image data stored in the origination generation data storage area 36, and writing the dot image data to the image data storage area 38. Third, the image data control section 50 executes a function for starting the destination information generation section 53, reading the dot image data stored in the destination information generation data storage area 37, and writing the dot image data to the image data storage area 38. Fourth, the image data control section 50 executes a function for starting the FAX coding section 51, coding the dot image data stored in the image data storage area 38 into a FAX code, and storing the FAX code to the FAX code data storage area 39.

In the embodiment, the image data control section 50 starts the origination generation section 52, so that the origination generation section 52 converts the data stored in the FAX number storage area 31, the transmission date and time storage area 32, and the transmitted page number storage area 33 into the dot image data, and stores the dot image data to the origination generation data storage area 36.

In the embodiment, the image data control section 50 starts the destination information generation section 53, so that the destination information generation section 53 converts the data stored in the destination information storage area 34 into the dot image data, and stores the dot image data to the destination information generation data storage area 37.

In the embodiment, the image data control section 50 starts the FAX coding section 51, so that the FAX coding section 51 codes the dot image data stored in the image data storage area 38 into the FAX code, and stores the FAX code to the FAX code data storage area 39.

Figure 11:
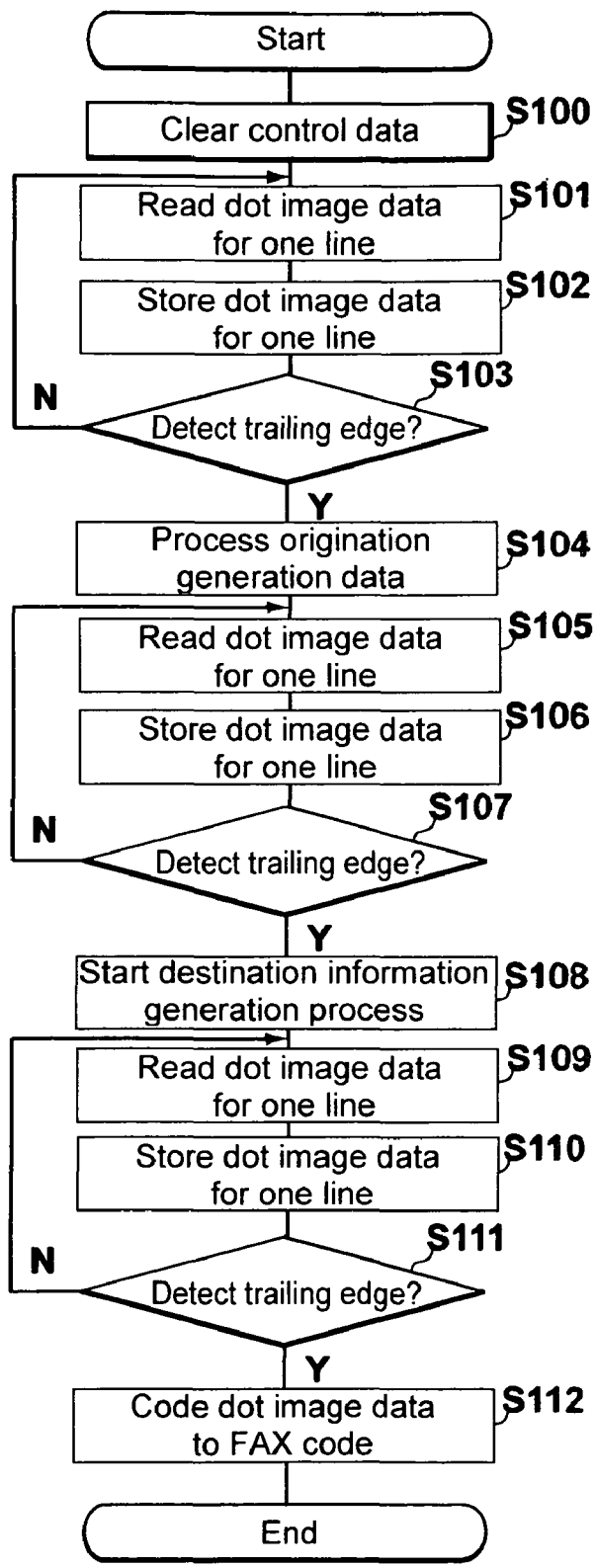
FIG. 11 is a flow chart showing an operation of the facsimile communication device in an image processing process according to the first embodiment of the present invention.

An operation of the facsimile communication device W in an image processing process will be explained next. In the operation, when the CPU 1 executes the image data processing program 24, the image data processing program 24 generates the image data control section 50, the FAX coding section 51, the origination generation section 52, and the destination information generation section 53 as the functional blocks, thereby generating the FAX code. FIG. 11 is a flow chart showing an operation of the facsimile communication device W in the image processing process according to the first embodiment of the present invention.

In step S100, the control data generated upon performing the operation is cleared. In step S101, the image data control section 50 reads original data converted to the dot image data from the original read data storage area 35 for one line. As described above, the dot data are stored in the original read data storage area 35 with the left upper corner of the original as the starting point.

In step S102, the image data control section 50 stores the dot image data for one line read from the original read data storage area 35 into the image data storage area 38. As described above, when the original has the A4 size and is scanned at the standard resolution (8 dots/mm), one line becomes 1,728 bytes (refer to FIG. 9).

In step S103, when the image data control section 50 detects a trailing edge of the original, the process proceeds to step S104. When the image data control section 50 does not detect the trailing edge of the original, the process returns to step S101, thereby processing the following lines. When a total number of bytes stored in the image data storage area 38 becomes equal to a total number of bytes of the original data stored in the original read data storage area 35, it is determined that the image data control section 50 detects the trailing edge of the original.

In step S104, the image data control section 50 starts the origination generation section 52, thereby starting processing origination generation data. Accordingly, the origination generation section 52 finds corresponding font data from the FAX number storage area 31, the transmission date and time storage area 32, and the transmitted page number storage area 33. Then, the origination generation section 52 rasterizes the font data, and stores the dot image data to the origination generation data storage area 36. At this moment, the origination generation data storage area 36 stores the dot image data with a left upper corner of the origination information as a starting point.

In step S105, the image data control section 50 reads the dot image data for one line from the origination generation data storage area 36. In step S106, the image data control section 50 stores the dot image data for one line read from the origination generation data storage area 36 into the image data storage area 38. As described above, when the original has the A4 size and is scanned at the standard resolution (8 dots/mm), one line becomes 1,728 bytes (refer to FIG. 9).

In step S107, when the image data control section 50 detects the trailing edge of the original, the process proceeds to step S108. When the image data control section 50 does not detect the trailing edge of the original, the process returns to step S105, thereby processing the following lines. When the total number of bytes stored in the image data storage area 38 becomes equal to the total number of bytes of the original data stored in the original read data storage area 35, it is determined that the image data control section 50 detects the trailing edge of the original.

In step S108, the image data control section 50 starts the destination information generation section 53, thereby starting a destination information generation process. Accordingly, the destination information generation section 53 finds corresponding font data from the destination information storage area 34. Then, the destination information generation section 53 rasterizes the font data, and stores the dot image data to the destination information generation data storage area 37. At this moment, the destination information generation data storage area 37 stores the dot image data with a left upper corner of the destination information as a starting point.

In step S109, the image data control section 50 reads the dot image data for one line from the destination information generation data storage area 37. In step S110, the image data control section 50 stores the dot image data for one line read from the destination information generation data storage area 37 into the image data storage area 38.

In step S111, when the image data control section 50 detects the trailing edge of the original, the process proceeds to step S112. When the image data control section 50 does not detect the trailing edge of the original, the process returns to step S109, thereby processing the following lines. In the step, the image data control section 50 compares a conversion number obtained through converting the byte number for one line temporarily stored in the memory area in step S108 to a bit number (for example, when the byte number for one line is 10 bytes, the bit number is 80 bits and the conversion number is 80) with a conversion number of the destination information for one line read in step S109, so that the image data control section 50 determines whether the image data control section 50 detects the trailing edge of the original.

In step S112, the FAX coding section 51 codes the dot image data stored in the image data storage area 38 to the FAX code, and stores the FAX code to the FAX code data storage area 39, thereby completing the process.

Figure 12:
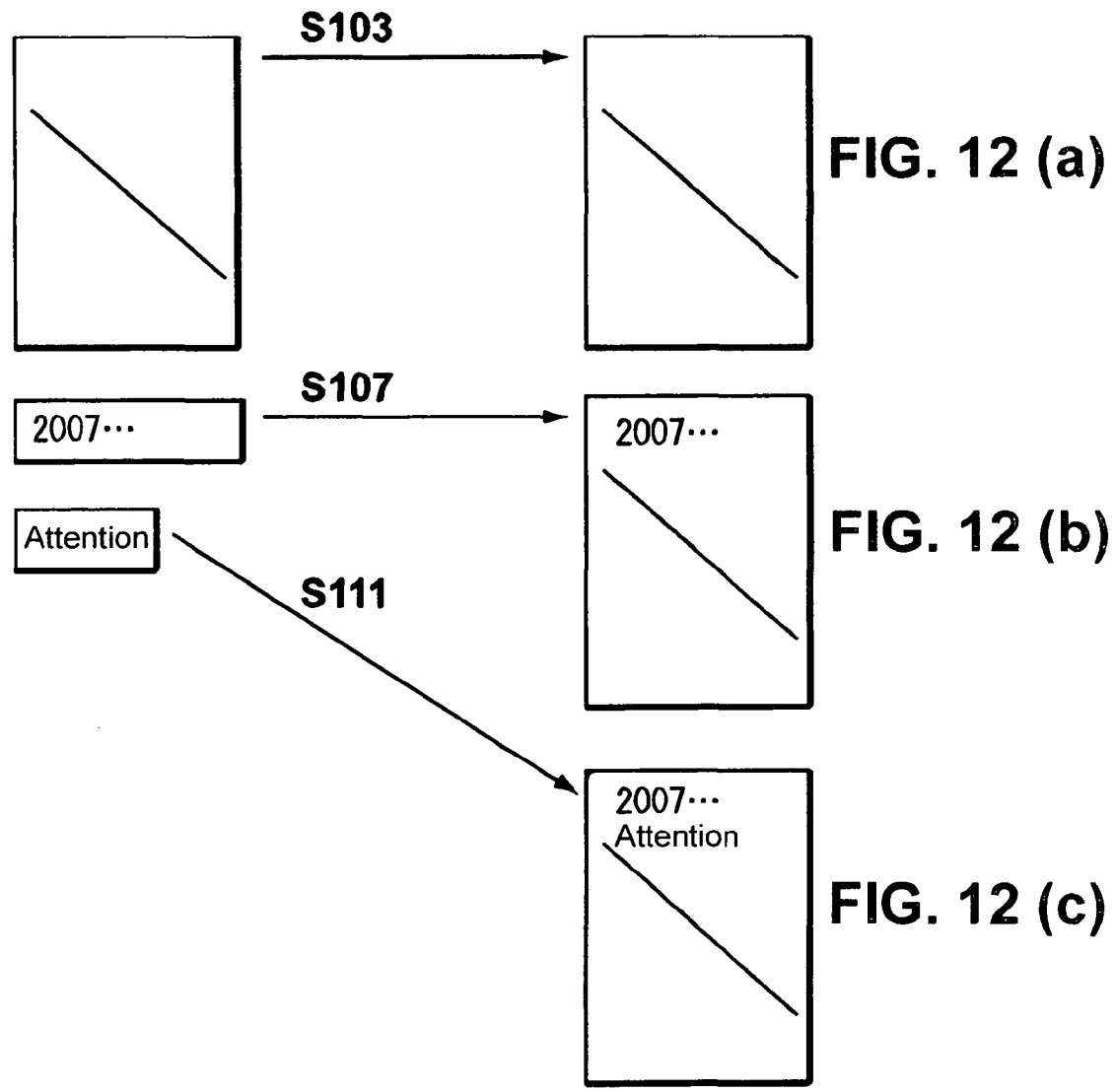
FIGS. 12(a) to 12(c) are schematic views No. 2 showing the image data storage area according to the first embodiment of the present invention.

A change in a state of the image data storage area 38 in the process described above will be explained next. FIGS. 12(*a*) to 12(*c*) are schematic views No. 2 showing the image data storage area 38 according to the first embodiment of the present invention. FIGS. 12(*a*) to 12(*c*) show the states of the image data storage area 38 changed in the process shown in FIG. 11, in which the original read data, the origination generation data, and the destination information are combined in the image data storage area 38.

More specifically, FIG. 12(*a*) shows the state of the image data storage area 38 when the trailing edge of the original is detected in step S103 (the dot image data are completely copied from the original read data storage area 35 to the image data storage area 38).

Further, FIG. 12(*b*) shows the state of the image data storage area 38 when the trailing edge of the original is detected in step S107 (the dot image data are completely copied from the origination generation data storage area 36 to the image data storage area 38). In this state, the origination generation data are added to a space of the image read data.

FIG. 12(*c*) shows the state of the image data storage area 38 when the trailing edge of the original is detected in step S111. In this state, the origination generation data and the destination information are added to the space of the image read data.

Figure 13:
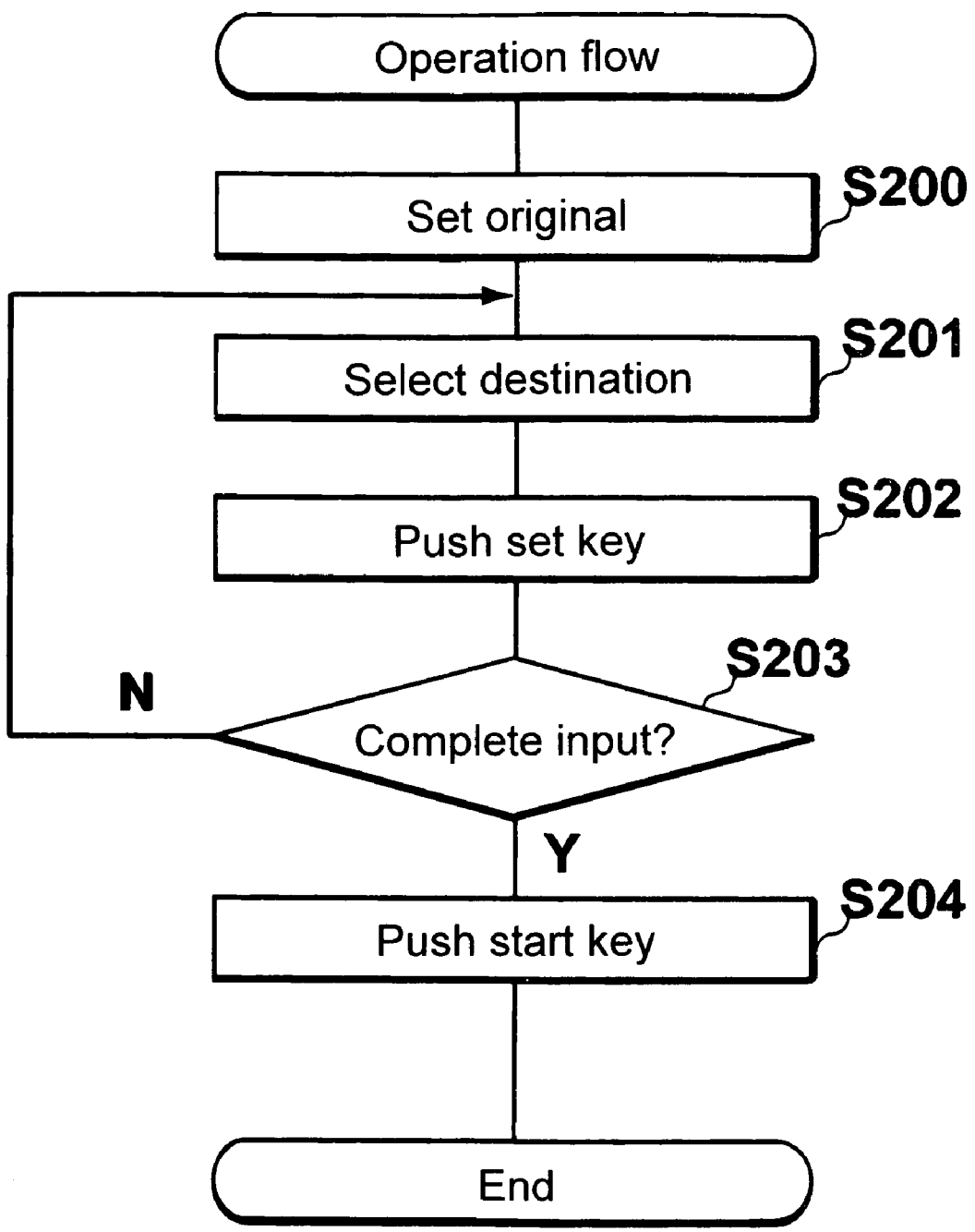
FIG. 13 is a flow chart showing an operation of the facsimile communication device according to the first embodiment of the present invention.

An operation of the facsimile communication device W will be explained next. FIG. 13 is a flow chart showing the operation of the facsimile communication device W according to the first embodiment of the present invention.

In the operation of the facsimile communication device W shown in FIG. 13, using the facsimile communication system shown in FIG. 1, the facsimile communication device W performs multicast communication to the facsimile communication device A, the facsimile communication device B, and the facsimile communication device C.

In step S200, the user sets the original to be transmitted on the reading unit 5 (refer to FIG. 4). In step S201, the user operates the operational panel 9 (refer to FIG. 6) to select a destination. In the case, it is assumed that the user selects the facsimile communication device A, the facsimile communication device B, and the facsimile communication device C.

In step S202, the user pushes a set key (refer to FIG. 6). In step S203, step S201 and step S202 are repeated until the destinations are completely input. In the case, when the facsimile communication device A, the facsimile communication device B, and the facsimile communication device C are completely selected, the process proceeds to step S204. In step S204, the user pushes the start key (refer to FIG. 6) to start transmission.

As described above, in the embodiment, the destination information is added to the transmitted information. Accordingly, in the facsimile communication device W having the multicast function, it is possible to add the destination to the transmitted image. As a result, it is possible for a person who receives the transmitted image to easily identify the destinations of the transmitted image.

Second Embodiment

A second embodiment of the present invention will be explained next. Components in the second embodiment similar to those in the first embodiment are designated with the same reference numerals, and explanations thereof are omitted. The components similar to those in the first embodiment provide similar effects, and explanations thereof are omitted.

In the first embodiment, the destination information is added to the transmitted information. In the second embodiment, instead of the destination information, a QR code (a trademark of Denso-wave) is added to the transmitted information, so that it is possible to increase an amount of information to be added to the transmitted information. The QR code is a two-dimensional code formed of bit data arranged in a vertical direction and a horizontal direction of an image. Needless to say, the QR code may include the destination information. In the following description, only difference from the first embodiment will be explained.

Figure 14:
FIG. 14 is a schematic view showing an example of received contents of multicast according to a second embodiment of the present invention.

FIG. 14 is a schematic view showing an example of received contents of multicast according to the second embodiment of the present invention. In this case, the facsimile communication device A (refer to FIG. 1) receives the received contents of multicast. As shown in FIG. 14, in the received contents, a text "Attention; this FAX letter is sent to parties coded in the bar code at a right lower corner. A special device will be needed to read the bar code." and the QR code is added to the contents of the transmitted original (refer to FIG. 2).

Figure 15:
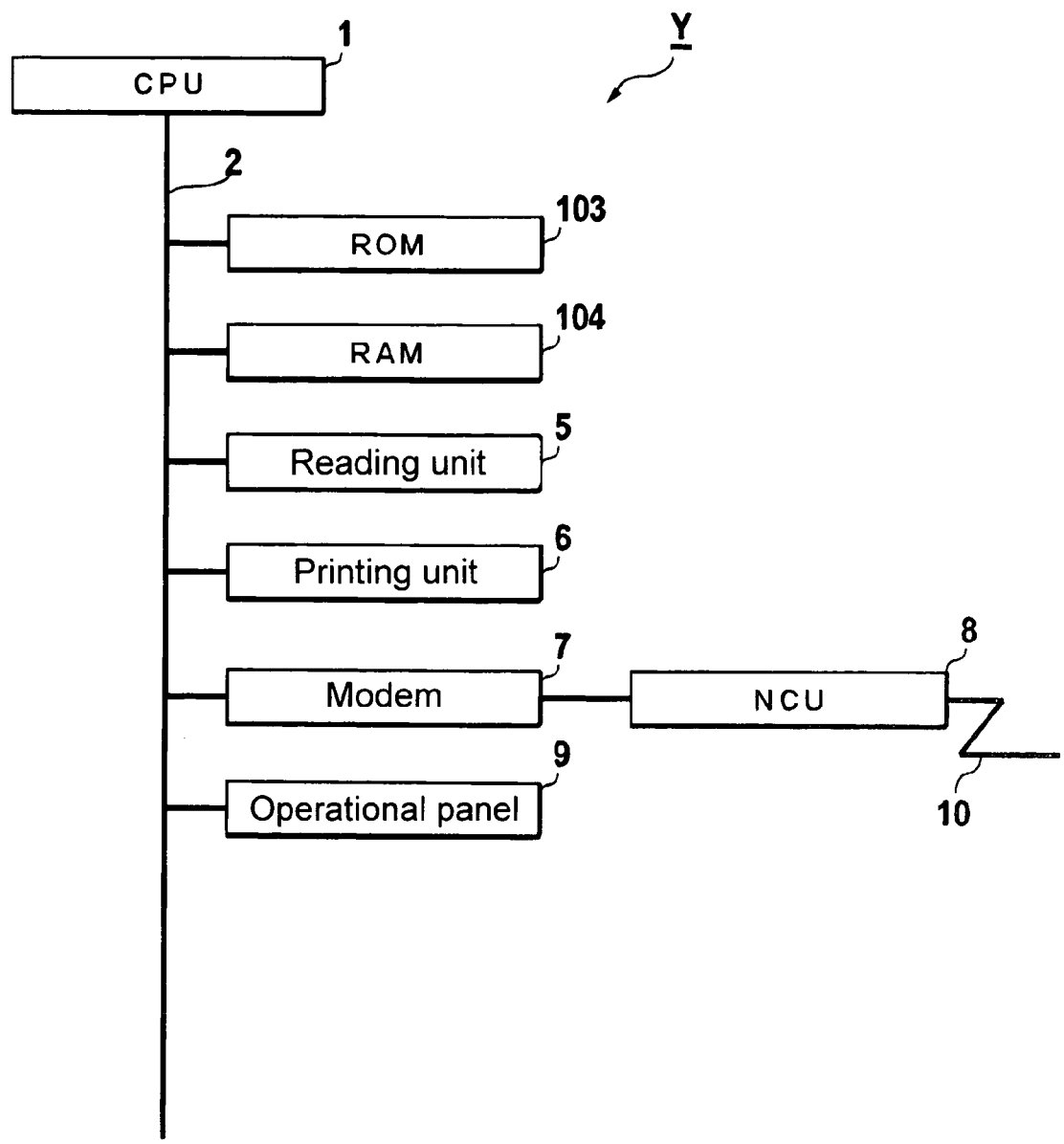
FIG. 15 is a block diagram showing a facsimile communication device according to the second embodiment of the present invention.

FIG. 15 is a block diagram showing a facsimile communication device Y according to the second embodiment of the present invention. As shown in FIG. 15, the facsimile communication device Y includes the CPU 1; the system bus 2; an ROM (Read Only Memory) 103; an RAM (Random Access Memory) 104; the reading unit 5; the printing unit 6; the modem 7; the NCU 8; and the operational panel 9.

In the second embodiment, the ROM 3 and the RAM 4 in the first embodiment are replaced with the ROM 103 and the RAM 104. The ROM 103 stores a specific control program to be executed with the CPU 1. The RAM 4 provides a calculation area necessary for the specific control program to be executed with the CPU 1.

Figure 16:
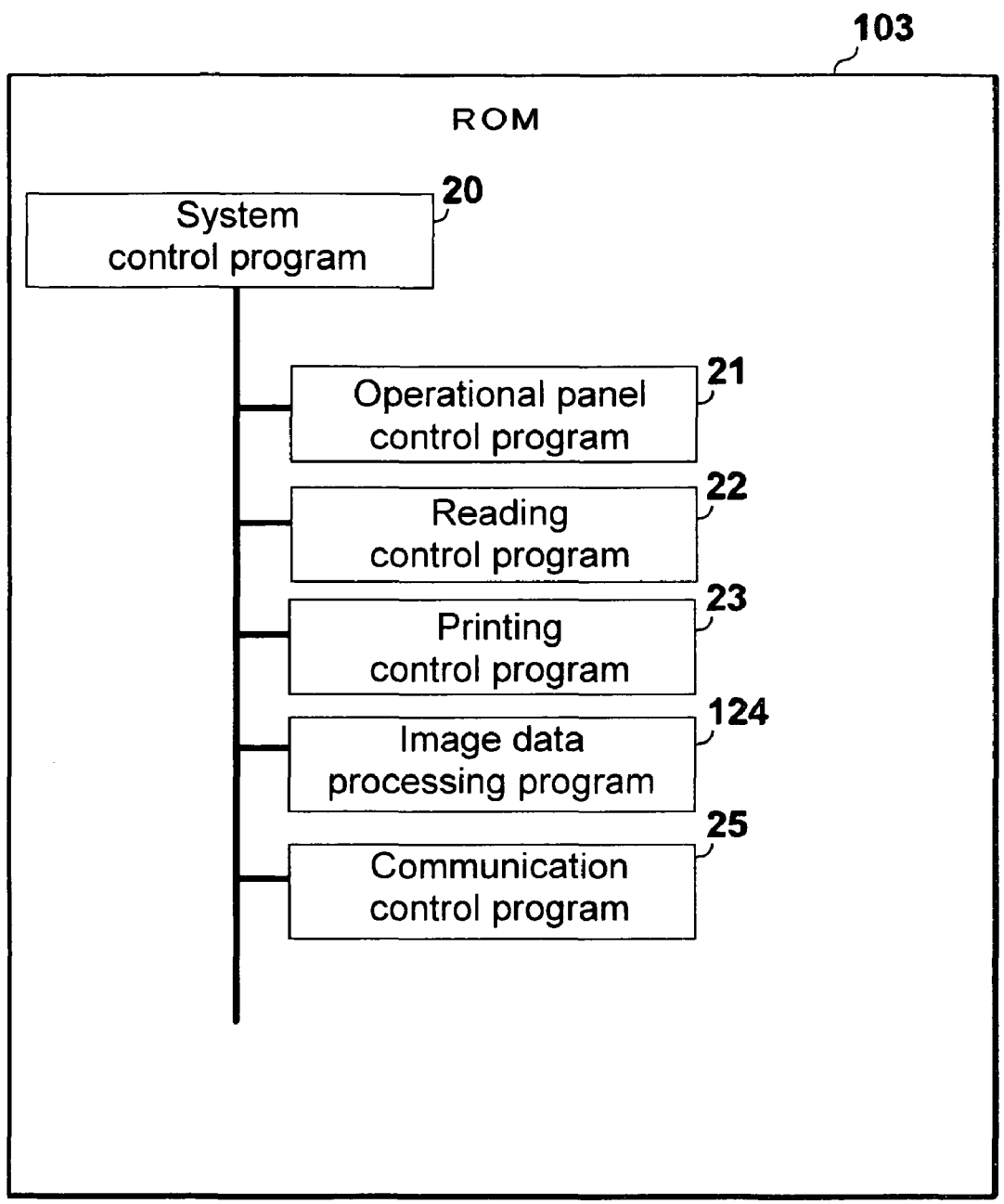
FIG. 16 is a schematic view showing contents of an ROM of the facsimile communication device according to the second embodiment of the present invention.

A configuration of the ROM 103 will be explained next. FIG. 16 is a schematic view showing contents of the ROM 103 of the facsimile communication device Y according to the second embodiment of the present invention.

As shown in FIG. 16, the ROM 3 includes the system control program 20; the operation panel control program 21; the reading control program 22; the printing control program 23; an image data processing program 124; and the communication control program 25.

In the second embodiment, the image data processing program 24 in the first embodiment is replaced with the image data processing program 124. The image data processing program 124 is a control program to be executed with the CPU 1 for executing edition of a transmitted image and generating FAX code data (described later).

Figure 17:
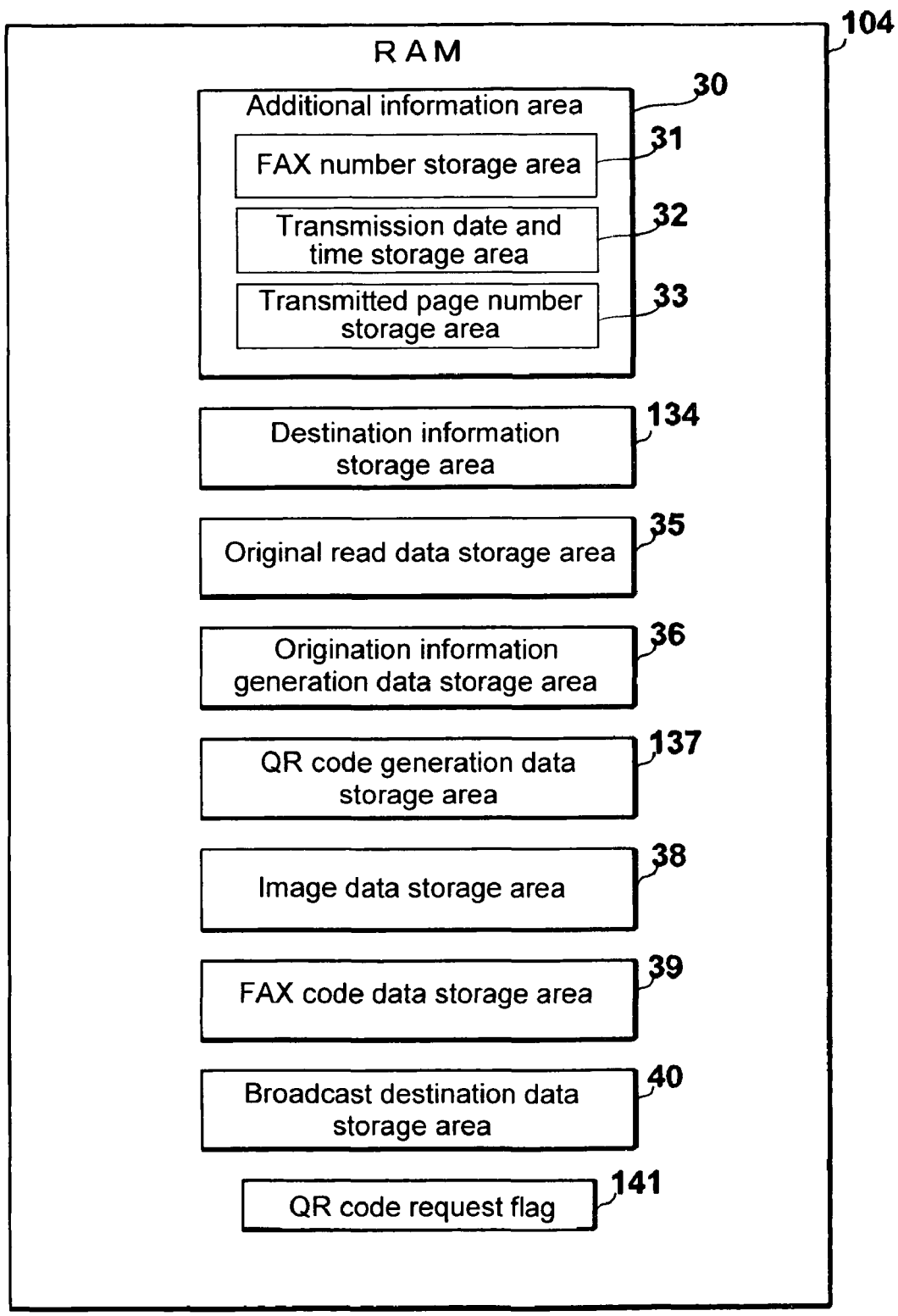
FIG. 17 is a schematic view showing contents of an RAM of the facsimile communication device according to the second embodiment of the present invention.

A configuration of the RAM 104 will be explained next. FIG. 17 is a schematic view showing contents of the RAM 104 of the facsimile communication device Y according to the second embodiment of the present invention.

As shown in FIG. 17, the RAM 104 includes the additional information area 30; a destination information storage area 134; the original read data storage area 35; the origination generation data storage area 36; a QR code generation data storage area 137; the image data storage area 38; the FAX code data storage area 39; the multicast destination data storage area 40; and a QR code request flag 141.

In the embodiment, the destination information storage area 34 and the destination information generation data storage area 37 in the first embodiment are replaced with the destination information storage area 134 and the QR code generation data storage area 137, respectively. Further, the QR code request flag 141 is added. The destination information storage area 134 stores destination information input by the user through the operational panel 9.

Figure 18:
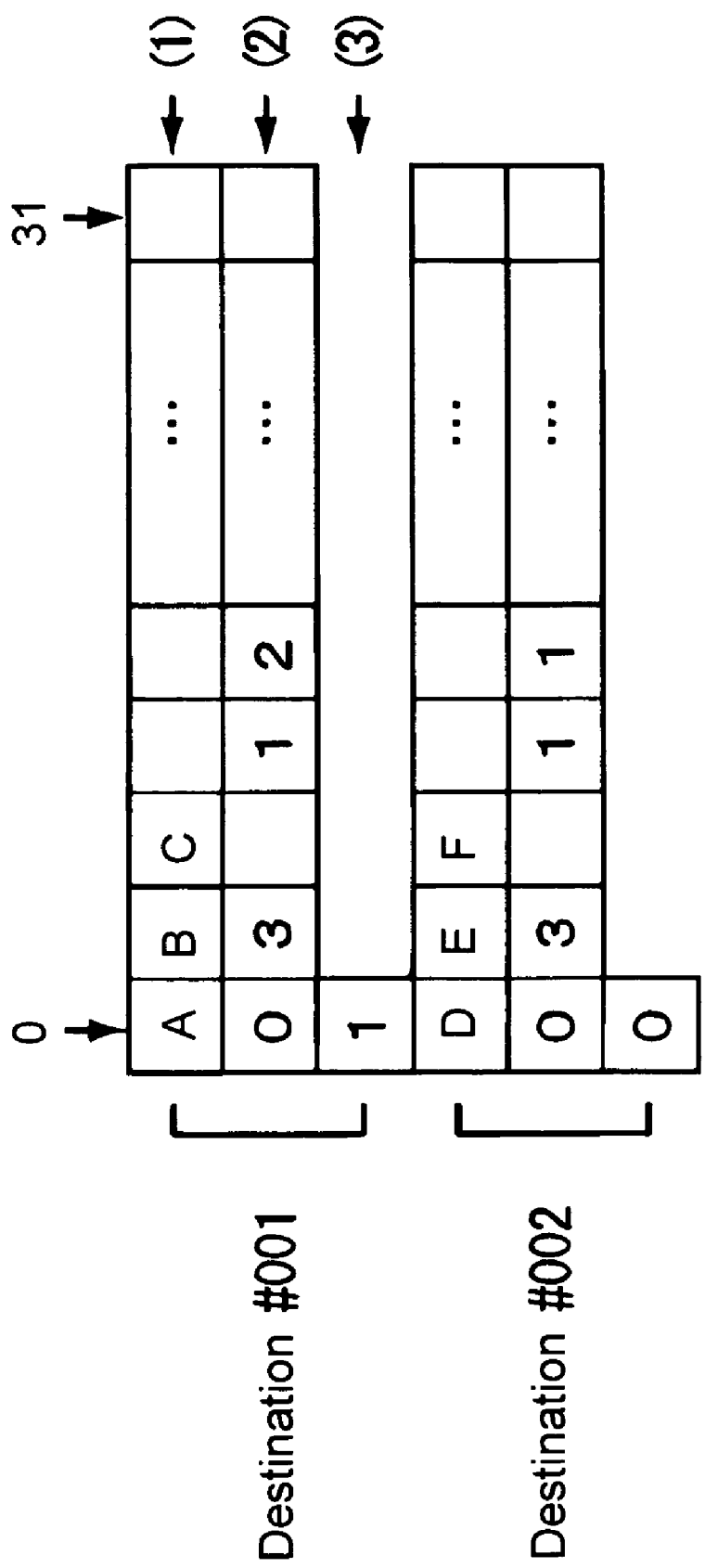
FIG. 18 is a schematic view showing a destination information storage area according to the second embodiment of the present invention.

A configuration of the destination information storage area 134 will be explained next. FIG. 18 is a schematic view showing the destination information storage area 134 according to the second embodiment of the present invention.

As shown in FIG. 18, the destination information storage area 134 includes a spreadsheet in which a destination name (1), a destination telephone number (2), and a QR transmission permission (3) are arranged per destination. When a destination is selected upon facsimile transmission, the destination information storage area 34 is used, and the destination telephone number (2) is used as a dial number upon transmission as well. Different from the destination information storage area 34 in the first embodiment, the QR transmission permission (3) is added.

In the embodiment, the QR code generation data storage area 137 temporarily stores dot image data generated when the CPU 1 executes the image data processing program 124. Further, the QR code request flag 141 is added when the user request addition through the operational panel 9.

Figure 19:
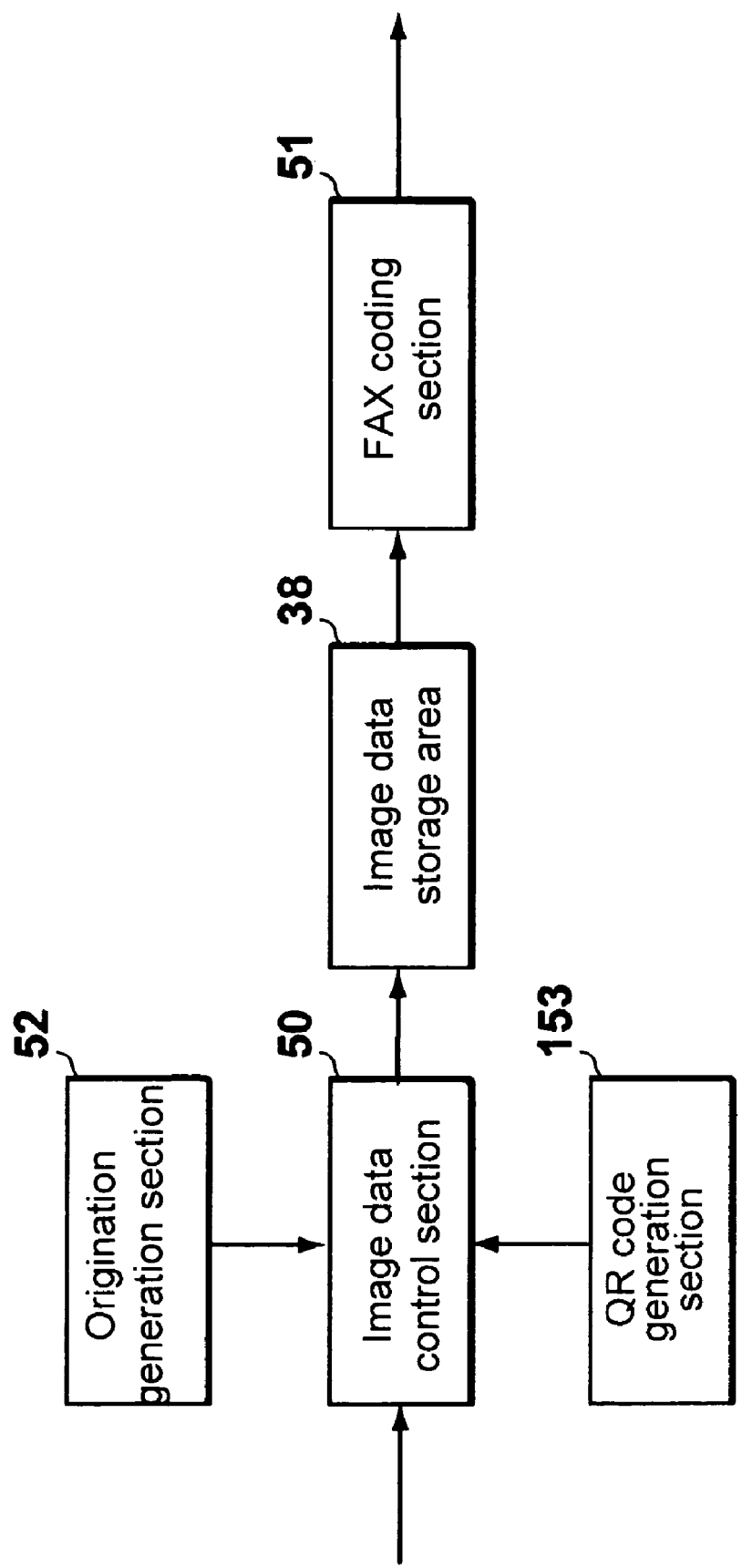
FIG. 19 is a block diagram showing a function of an image data processing program according to the second embodiment of the present invention.

A function of the image data processing program 124 will be explained next. FIG. 19 is a block diagram showing a function of the image data processing program 124 according to the second embodiment of the present invention.

As shown in FIG. 19, when the CPU 1 executes the image data processing program 124, the image data processing program 124 generates the image data control section 50; the FAX coding section 51; the origination generation section 52; and a QR code generation section 153 as functional blocks.

In the second embodiment, the destination information generation section 53 in the first embodiment is replaced with the QR code generation section 153. The image data control section 50 starts the QR code generation section 153, so that the QR code generation section 153 adds the data stored in the destination information storage area 34 to the QR code, converts into the dot image data, and stores the dot image data to the QR code generation data storage area 137.

Figure 20:
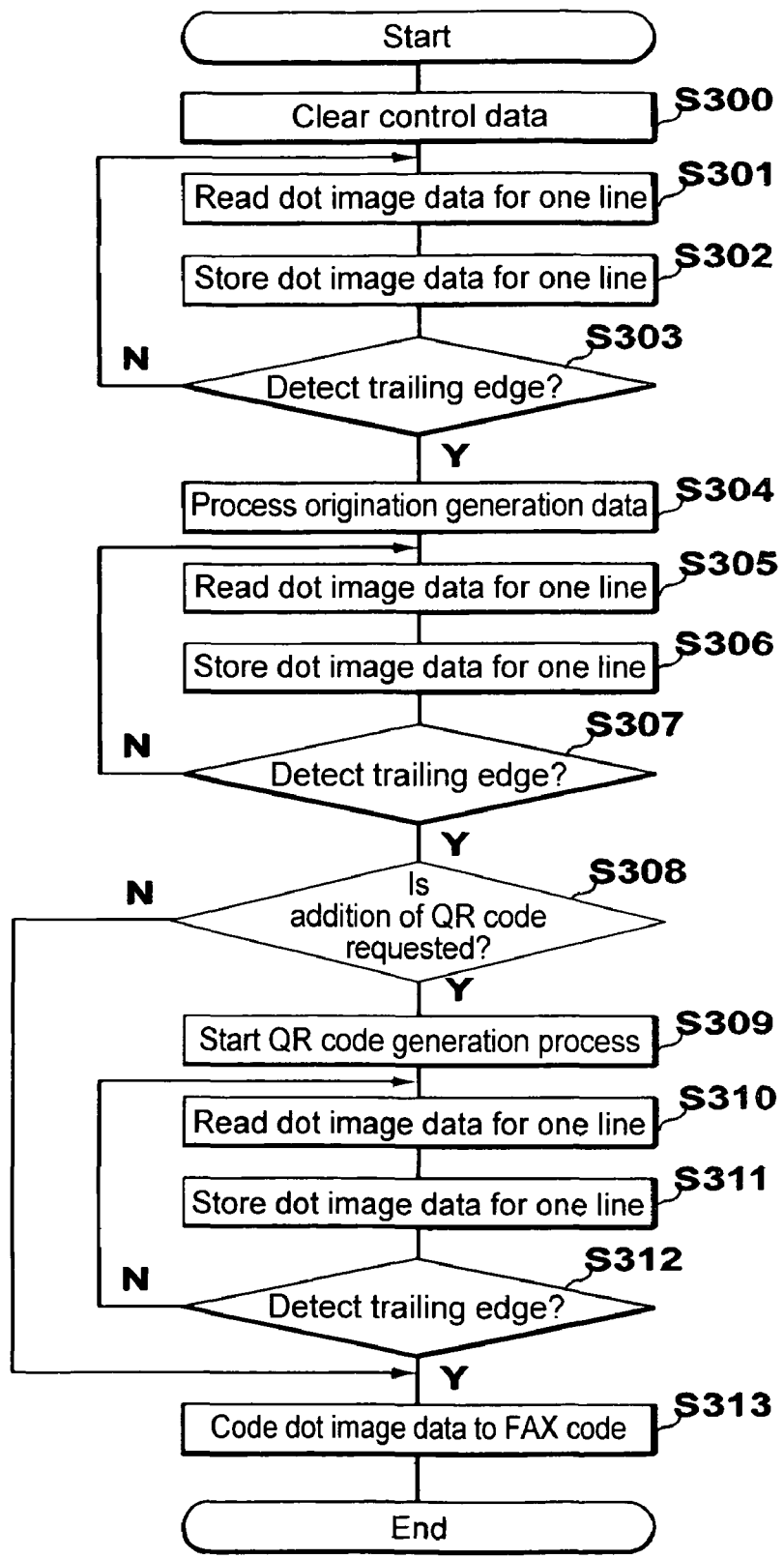
FIG. 20 is a flow chart showing an operation of the facsimile communication device in an image processing process according to the second embodiment of the present invention.

An operation of the facsimile communication device Y in an image processing process will be explained next. In the operation, when the CPU 1 executes the image data processing program 124, the image data processing program 124 generates the image data control section 50, the FAX coding section 51, the origination generation section 52, and the QR code generation section 153 as the functional blocks, thereby generating the FAX code. FIG. 20 is a flow chart showing the operation of the facsimile communication device Y in the image processing process according to the second embodiment of the present invention.

In step S300, the image data control section 50 clears the control data generated upon performing the operation. In step S301, the image data control section 50 reads original data converted to the dot image data from the original read data storage area 35 for one line. As described above, the dot data are stored in the original read data storage area 35 with the left upper corner of the original as the starting point.

In step S302, the image data control section 50 stores the dot image data for one line read from the original read data storage area 35 into the image data storage area 38. As described above, when the original has the A4 size and is scanned at the standard resolution (8 dots/mm), one line becomes 1,728 bytes (refer to FIG. 9).

In step S303, when the image data control section 50 detects the trailing edge of the original, the process proceeds to step S304. When the image data control section 50 does not detect the trailing edge of the original, the process returns to step S301, thereby processing the following lines. When the total number of bytes stored in the image data storage area 38 becomes equal to the total number of bytes of the original data stored in the original read data storage area 35, it is determined that the image data control section 50 detects the trailing edge of the original.

In step S304, the image data control section 50 starts the origination generation section 52, thereby starting processing the origination generation data. Accordingly, the origination generation section 52 finds corresponding font data from the FAX number storage area 31, the transmission date and time storage area 32, and the transmitted page number storage area 33. Then, the origination generation section 52 rasterizes the font data, and stores the dot image data to the origination generation data storage area 36. At this moment, the origination generation data storage area 36 stores the dot image data with the left upper corner of the origination information as the starting point.

In step S305, the image data control section 50 reads the dot image data for one line from the origination generation data storage area 36. In step S306, the image data control section 50 stores the dot image data for one line read from the origination generation data storage area 36 into the image data storage area 38. As described above, when the original has the A4 size and is scanned at the standard resolution (8 dots/mm), one line becomes 1,728 bytes (refer to FIG. 9).

In step S307, when the image data control section 50 detects the trailing edge of the original, the process proceeds to step S308. When the image data control section 50 does not detect the trailing edge of the original, the process returns to step S305, thereby processing the following lines. When the total number of bytes stored in the image data storage area 38 becomes equal to the total number of bytes of the original data stored in the original read data storage area 35, it is determined that the image data control section 50 detects the trailing edge of the original.

In step S308, the image data control section 50 determines whether the addition of the QR code is requested. When the addition of the QR code is requested, the process proceeds to step S309. When the addition of the QR code is not requested, the process proceeds to step S313. When the QR code request flag 141 stands, it is determined that the addition of the QR code is requested.

In step S309, the image data control section 50 starts the QR code generation section 153, thereby starting a QR code generation process. Accordingly, the QR code generation section 153 finds corresponding font data from the destination information storage area 134. Then, the QR code generation section 153 rasterizes the font data, and stores the dot image data to the QR code generation data storage area 137.

Further, the QR code generation section 153 stores a bite number for one line in a temporary memory area. One line is data scanned the QR code from a left side to a right side, and has a bite number corresponding to an amount of information contained in the QR code. At this moment, the QR code generation data storage area 137 stores the dot image data with a left upper corner of the QR code as a starting point.

In step S310, the image data control section 50 reads the dot image data for one line of the QR code from the QR code generation data storage area 137. In step S311, the image data control section 50 stores the dot image data for one line read from the QR code generation data storage area 137 into the image data storage area 38.

In step S312, when the image data control section 50 detects the trailing edge of the original, the process proceeds to step S313. When the image data control section 50 does not detect the trailing edge of the original, the process returns to step S310, thereby processing the following lines. In the step, the image data control section 50 compares a conversion number obtained through converting the byte number for one line temporarily stored in the memory area in step S310 to a bit number (for example, when the byte number for one line is 10 bytes, the bit number is 80 bits and the conversion number is 80) with a conversion number of the QR code for one line read in step S310, so that the image data control section 50 determines whether the image data control section 50 detects the trailing edge of the original.

In step S313, the FAX coding section 51 codes the dot image data stored in the image data storage area 38 to the FAX code, and stores the FAX code to the FAX code data storage area 39, thereby completing the process.

Figure 21:
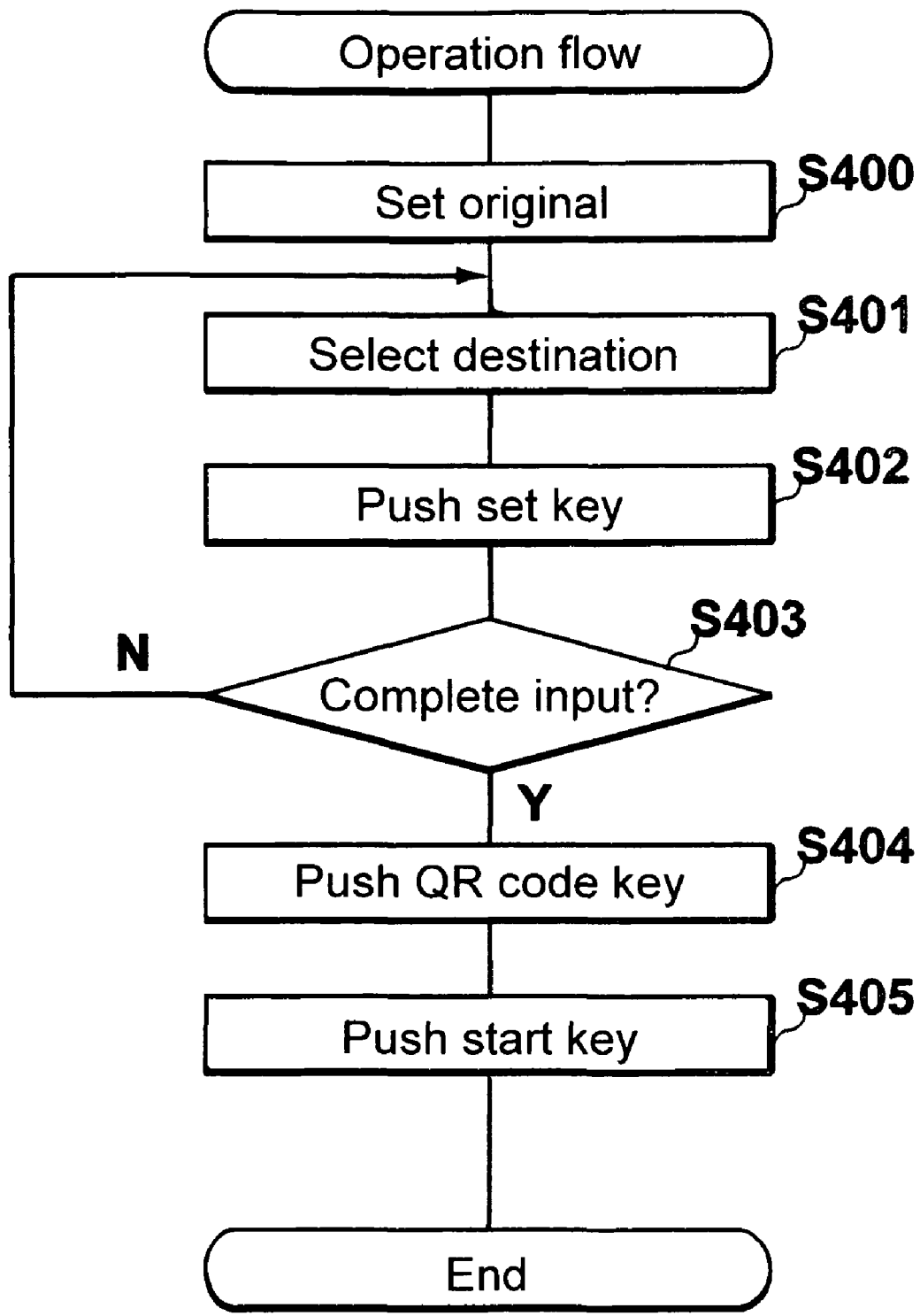
FIG. 21 is a flow chart showing an operation of the facsimile communication device according to the second embodiment of the present invention.

An operation of the facsimile communication device Y will be explained next. FIG. 21 is a flow chart showing the operation of the facsimile communication device Y according to the second embodiment of the present invention.

In the operation of the facsimile communication device Y shown in FIG. 21, with the facsimile communication system shown in FIG. 1, the facsimile communication device Y performs multicast communication to the facsimile communication device A, the facsimile communication device B, and the facsimile communication device C.

In step S400, the user sets the original to be transmitted on the reading unit 5 (refer to FIG. 4). In step S401, the user operates the operational panel 9 (refer to FIG. 6) to select a destination. In the case, it is assumed that the user selects the facsimile communication device A, the facsimile communication device B, and the facsimile communication device C.

In step S402, the user pushes the set key (refer to FIG. 6). In step S403, step S401 and step S402 are repeated until the destinations are completed input. In the case, when the facsimile communication device A, the facsimile communication device B, and the facsimile communication device C are completely selected, the process proceeds to step S404. In step S404, the user pushes the QR code key (refer to FIG. 6) to request the addition of the QR code. In step S405, the user pushes the start key (refer to FIG. 6) to start transmission.

As described above, in the embodiment, the QR code is added to the transmitted information, thereby making it possible to transmit a larger amount of messages. Accordingly, in the facsimile communication device W having the multicast function, it is possible to transmit the transmitted image to the destinations. As a result, it is possible for a person who receives the transmitted image to easily identify the destinations of the transmitted image.

In the embodiments described above, the present invention is applied to the facsimile communication device W and the facsimile communication device Y (refer to FIG. 1), and may be applicable to the facsimile communication device A, the facsimile communication device B, and the facsimile communication device C while the facsimile communication device W or the facsimile communication device Y is a receiving device.

In this case, it is necessary to provide a receiving unit and an image forming unit. The receiving unit receives the transmitted image including multicast destination information (or coded data) send from the facsimile communication device W or the facsimile communication device Y. The image forming unit forms the transmitted image including the multicast destination information (or coded data) received with the receiving unit on a specific medium as a visible image through an electro-photography method or an ink-jet method.

The disclosure of Japanese Patent Application No. 2007-304280, filed on Nov. 26, 2007, is incorporated in the application by reference.

While the invention has been explained with reference to the specific embodiments of the invention, the explanation is illustrative and the invention is limited only by the appended claims.

What is claimed is:

1. A facsimile communication device having a multicast function capable of sequentially transmitting a transmission image to a plurality of receiving devices, comprising:
   an origination information data generation unit for generating origination information data related to the facsimile communication device;
   a code data generation unit for generating code data including a multicast destination to which the facsimile communication device transmits the transmission image; and
   a transmission image data generation unit for adding the origination information data and the code data to the transmission image, said transmission image data generation unit being configured to add first information to the transmission image, said first information indicating that the code data is added to the transmission image.

2. The facsimile communication device according to claim 1, further comprising a receiving unit for receiving the transmission image including the code data, and an image forming unit for forming the transmission image on a specific medium as a visible image.

3. The facsimile communication device according to claim 1, further comprising a reading unit for inputting the transmission image, and a network communication unit for sending the transmission image after sending image data of the origination information data, and for sending two-dimensional coded data of the multicast destination information data after sending the transmission image.

4. The facsimile communication device according to claim 3, wherein said reading unit includes a scanner for reading an original and converting to dot image data.

5. The facsimile communication device according to claim 3, wherein said network communication unit is adopted to communicate with a destination of the multicast destination information data.

6. A facsimile communication system comprising the facsimile communication device according to claim 1.

7. The facsimile communication device according to claim 1, wherein said transmission image data generation unit is configured to add second information to the transmission image, said second information indicating that a special device is needed to read the code data.

8. The facsimile communication device according to claim 7, wherein said transmission image data generation unit is configured to add the second information so that the second information is displayed between the origination information data and the code data in the transmission image.

9. The facsimile communication device according to claim 1, wherein said transmission image data generation unit is configured to add the code data so that the code data is displayed at a lower portion of the transmission image.

10. The facsimile communication device according to claim 1, wherein said transmission image data generation unit is configured to add the first information so that the first information is displayed between the origination information data and the code data in the transmission image.

* * * * *